July 22, 1941.  H. G. HENRY  2,250,077
TIRE PRESSURE SIGNAL
Filed Nov. 29, 1939
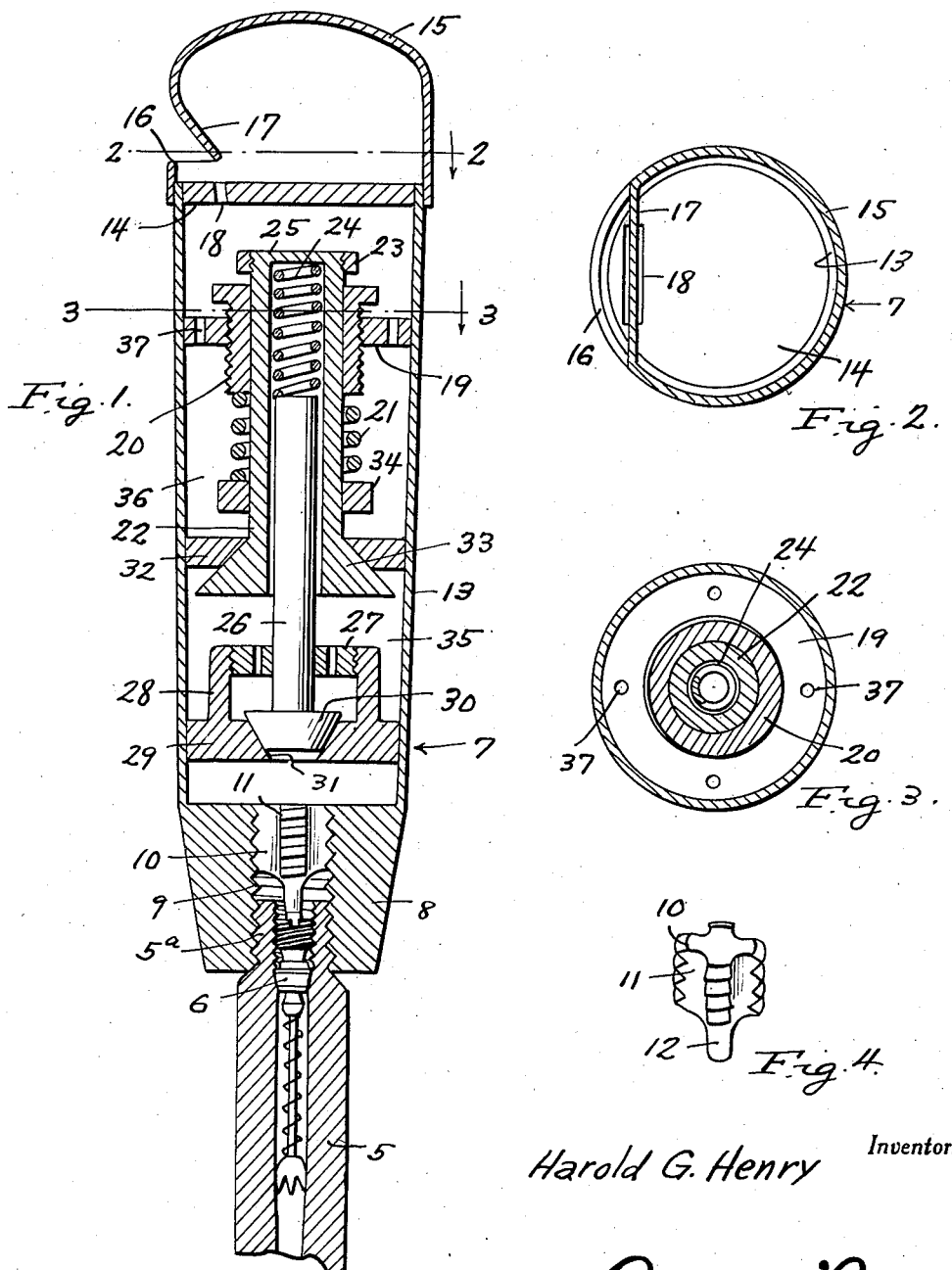
Inventors
Harold G. Henry
By Clarence A. O'Brien
and Hyman Berman
Attorneys Patented July 22, 1941

2,250,077

UNITED STATES PATENT OFFICE 2,250,077

TIRE PRESSURE SIGNAL

Harold G. Henry, King City, Calif., assignor of one-half to Angelo L. Morgantini, Greenfield, Calif.

Application November 29, 1939, Serial No. 306,731

1 Claim. (Cl. 116—34)

This invention appertains to new and useful improvements in devices for signaling low pressure in automobile tires.

The principal object of the present invention is to provide an audible warning signal for automobile drivers adapted to announce the occasion of low pressure in one or more of their tires, so that the air pressure can be replenished to the end that wear on the tires will be saved.

Other objects and advantages of the invention will become apparent to the reader of the following specification.

In the drawing:

Figure 1 represents a longitudinal sectional view through the signal.

Figure 2 is a section on the line 2—2 of Figure 1.

Figure 3 is a cross section on the line 3—3 of Figure 1.

Figure 4 is a perspective view of the valve holding plug.

Referring to the drawing wherein like numerals designate like parts, it can be seen that numeral 5 represents a conventional valve tube of an automobile wheel in which a conventional valve mechanism 6 is located. The present invention, generally referred to by numeral 7, is screwed onto the tube 5 as clearly shown in Figure 1.

This signal structure 7 consists of a base block 8 having a threaded bore 9 therein for receiving a reduced and threaded portion 5a of the barrel 5. In this threaded bore 9 is located a threaded plug 10 which has longitudinal channelways 11 therein. This plug has a pintle extension 12 which engages a valve structure 6 to hold the same in open position.

Rising from the body 8 is a shell 13 which has a cross partition 14 in the upper end thereof and over this is disposed a hood 15 which is slit at 16 with the portion above the slit bent inwardly to form a whistle lip 17 terminating over an air discharge slot 18 in the cross partition 14.

Below the cross partition 14 is a second partition 19 through which a threaded bushing 20 is disposed and adjustable to regulate the tension of a compressible spring 21, which circumscribes a tube 22. This tube 22 has a stop nut 23 at its upper end and within the upper portion of the tube 22 is a compressible coiled spring 24. This spring 24 is interposed between an upper end 25 of the tube 22 and an upper end of the stem 26. The stem 26 operates through a perforated plug 27 in an upper portion of the cage 28 which is carried by the horizontal partition 29. The lower end of the stem 26 is equipped with a valve element 30 which operates on a seat 31 in the partition 29. A seat formed partition 32 between the partitions 29 and 19 accommodates a valve element 33 at the lower end of the tube 22. A collar 34 on the tube 22 has the aforementioned compressible spring 21 interposed between itself and the bushing 20.

It can now be seen that normally when a sufficiently high pressure is present in the tire, the air pressure will maintain the valve 30 open, but the valve 33 closed. In the event the pressure in the tire falls dangerously low, there will be insufficient pressure in the chamber 35 to hold the valve 33 closed against the action of the spring 21. The valve 33 will then yield to the spring 21, unseating itself so that the air can reach the chamber 36, from where it passes through the opening 37 in the partition 19 and through the air slot 18 to the whistle lip 17, thus affording an audible alarm that the air pressure in the tire is low.

When the pressure in the tire falls to a predetermined degree, the spring 24 will overcome the valve 30 and cause closing of the same, thus preventing any further escape of air, and to the end that the vehicle can be driven to the closest service station for air without likelihood that damage to the inner tube will be incurred, by reason of a totally flat tire.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A tire deflation signal comprising a shell adapted for attachment to the valve of a tire tube and including means for holding said valve open when the shell is attached, a whistle on said shell, and means to operate said whistle on decrease of air pressure in said tube comprising a spring tensioned normally closed valve in said shell opening inwardly thereof under normal air pressure in said tube to admit a charge of air under pressure into said shell for passage to said whistle, a spring tensioned normally open valve in said shell intermediate the normally closed valve and said whistle closing under opening of the normally closed valve to block passage of said charge of air to said whistle while the normally closed valve is held open by normal pressure in the tire, and a pair of stems for said normally closed and open valves, respectively, endwise movable relatively and one telescoping in the other the spring of one of said normally closed and open valves being housed in one of said stems, and the spring of the other of said valves surrounding said one stem.

HAROLD G. HENRY.